United States Patent [19]
Coccaro et al.

[11] Patent Number: 5,535,867
[45] Date of Patent: Jul. 16, 1996

[54] TORQUE REGULATING COUPLING

[76] Inventors: Albert V. Coccaro, 9 Capricon La., Mount Kisco, N.Y. 10549; Paul C. Scifo, 50 E. 89th St., Apt. 6C, New York, N.Y. 10128

[21] Appl. No.: 146,581

[22] Filed: Nov. 1, 1993

[51] Int. Cl.⁶ .................... F16D 43/20; B25B 23/157
[52] U.S. Cl. .................. 192/56.1; 81/477; 173/180; 192/55.1
[58] Field of Search .................... 192/56 R, 55; 81/477; 173/176, 178, 180

[56] References Cited

U.S. PATENT DOCUMENTS

| | | | |
|---|---|---|---|
| 2,409,385 | 10/1946 | Pletcher | 81/477 |
| 2,558,158 | 6/1951 | Rock | 81/477 X |
| 3,666,021 | 5/1972 | Whitehouse | 173/180 |
| 3,744,350 | 7/1973 | Raff | 81/477 |
| 3,956,905 | 5/1976 | Thackston | 173/178 X |
| 4,249,435 | 2/1981 | Villeneuve et al. | 81/477 X |
| 4,346,749 | 8/1982 | Singletary et al. | 192/55 X |
| 4,535,850 | 8/1985 | Alexander | 81/477 X |
| 4,572,041 | 2/1986 | Rissmann | 81/477 |
| 4,687,082 | 8/1987 | Lenfeldt | 192/55 |
| 4,774,864 | 10/1988 | Dossier | 81/477 X |
| 5,048,381 | 9/1991 | Allen et al. | 81/477 |

FOREIGN PATENT DOCUMENTS

| | | | |
|---|---|---|---|
| 463067 | 4/1951 | Italy | 81/477 |
| WO8908536 | 9/1989 | WIPO | 173/176 |

*Primary Examiner*—Andrea L. Pitts
*Attorney, Agent, or Firm*—Paul C. Scifo

[57] ABSTRACT

A torque regulating coupling for use with an impact wrench drive and socket, the coupling for connecting an impact wrench drive to the a wrench socket used to tighten threaded fasteners so that the maximum torque applied to the fastener can be limited to a predetermined value. The coupling featuring a slider, movably mounted within in a coupling body which is adapted to be connected to the wrench drive. Additionally, the coupling includes a multi-element, torque transmission member axially disposed within the coupling body and arranged to be connected to a wrench socket for engaging the fastener. Still further the coupling includes a an adjustment mechanism that has a sleeve and position pin in one form and sleeve and gear train in another for locating the slider along the length of the transmission member to regulate the maximum amount of torque delivered from the wrench drive to the fastener.

12 Claims, 6 Drawing Sheets

TORQUE REGULATING COUPLING

BACKGROUND OF THE INVENTION

1. Field of Invention

This invention concerns a torque regulating coupling for connecting an impact wrench drive to a wrench socket used to tighten threaded fasteners so that the maximum torque applied to the fastener can be limited to a predetermined value, and more particularly, to a torque regulating coupling featuring a slider, movably mounted within a coupling body which is adapted to be connected to the wrench drive, and a multi-element, torque transmission member axially disposed within the coupling body and arranged to be connected to a wrench socket for engaging the fastener, the slider being movable along the length of the transmission member to regulate the maximum amount of torque delivered from the wrench drive to the fastener.

2. Prior Art

Because of their speed and ease of use, impact wrenches have become extremely popular for tightening and loosing threaded fasteners featured in all types of mechanical systems. In the typical application, the threaded fastener is a nut or bolt assembly used to join mating mechanical components. In use, the impact wrench, which characteristically includes a wrench drive in the form of a gun and a wrench socket to fit the nut or bolt to be tightened or loosened, requires only that the operator affix the appropriately sized socket to the drive, fit the socket over the nut or bolt, and press the trigger.

The gun, most commonly pneumatically powered, then produces a stream of rotary impulses that are transmitted to the socket and fastener to effortlessly turn down or withdraw the nut or bolt. As is well known in the art, impact wrenches feature a drive having a rotary hammer that on application of power periodically strikes an anvil connected to the wrench drive output to produce the stream of rotary impulses that can be subsequently applied to the nut or bolt.

As is well known and as would be appreciated by those skilled in the art, the torque impulse applied by the impact wrench is designed such that while the peak torque may exceed the yield point of the nut or bolt assembly being tightened, the duration of the impulse is made short enough so that in normal operation the elastic limit of the assembly is not reached. Accordingly, though the peak torque might be sufficient to break the nut or bolt assembly being tightened if the peak torque were applied continuously, since the peak torque is applied for a short time i.e., the duration of the impulse, the assembly is not damaged in normal operation. In this regard, further understanding of the design and operation of impact wrenches may be found in, for example, U.S. Pat. No. 3,744,350.

While impact wrenches have proven themselves to be an invaluable aid to mechanics, assembly works and all others required to put together and take apart mechanical systems, problems have arisen with their use. Because impact wrench users when tightening nuts or bolts usually merely either listen to and/or watch the nut or bolt to determine when they are "tight enough", improper and uncertain amounts of torque are commonly inflicted on the assemblies. In tightening nuts and bolts, the impact wrench, by virtue of the applied stream of impulses, rotates the nut or bolt in successively smaller increments as the nut or bolt tightens. This gives rise to a characteristic "hammering sound" and accompanying "rotary blur" that diminishes in pitch and view, respectively, as the nut or bolt is tightened. As a result, for the sake of convenience, most users simply stop when they feel the sound and blur have diminished "enough" to satisfy the particular needs of the assembly they are working on.

But, this estimated "enough" leads to uncertainty at best, and at worst to either damaged or dangerously underfastened assemblies. If the finally applied torque is too great, fasteners become damaged or sheared and matting parts deformed. Additionally, substantial difficulty can be encountered in attempting to take apart such assemblies. On the other hand, if the finally applied torque is too low, potentially dangerous, inadequately fastened assemblies can result which are susceptible to coming apart on their own.

The problems of improper and inaccurate torque application have been of concern to the impact wrench industry for some time. However, though a number of approaches have been proposed for more accurately fixing the maximum torque applied by an impact wrench, none of the approaches thus far proposed have provided a simple, compact, and inexpensive solution that enables an operator to quickly, easily and cheaply regulate the torque finally applied.

For example, though Raff, in U.S. Pat. No. 3,744,350, proposes a variety of devices, each featuring a drive receiving member connected to a wrench member by a fixed, resilient element; for example a rubber bushing, spring, slotted sleeve, etc., for limiting the amount of torque applied to a fastener, none of the proposed devices includes means for adjusting the amount of torque transmitted. Accordingly, though the Raff design is able to establish a maximum applied torque, a user would be required to maintain a substantial inventory of devices for each of the maximum torque values likely to be set. Further, the user would be compelled to undergo the inconvenience of interrupt operation, disconnect the old device and replace it with a new one of different rating each time the maximum applied torque was sought to be changed.

On the other hand, though adjustable torque limiting devices have been proposed, their designs have been either awkward in form and operation, or expensive to make and use. For example, while Schoeps, in U.S. Pat. No. 3,832,916, describes an adjustable torque limiting device for use with an impact wrench, it requires use of a coupling sleeve from which a coaxial torsion bar must be extracted and maintained. In accord with the Schoeps design, though the maximum transmitted torque can be adjustable set, to do so the torsion bar must be withdrawn from the device sleeve in fixed spans producing a lengthy and awkward structure susceptible of misalignment and associated rotary instability in operation. While Schoeps notes that fixed-length adjustable devices having an internal element movable along a bar had been known prior to his design, he states such device were found to produce large losses in impact energy and accordingly, presumably, were found undesirable.

Still further, Reynolds in U.S. Pat. Nos. 2,822,677 and 3,129,571 discloses yet additional approaches for adjustable, torque-limiting devices. However, the Reynolds' devices, as described in his patents, calls for use of complicated, mechanical assemblies that require a torsion bar to be rotationally pre-stressed using splined and/or geared assemblies in order to adjust the maximum torque transmitted. However, as is apparent from the descriptions given, due to the use of the mechanically sophisticated splined and geared assemblies, the proposed devices are inclined to be difficult and expensive to manufacture, rendering them unsuited for mass markets.

SUMMARY OF INVENTION

Accordingly, it is an object of present invention to provide a torque limiting coupling that is adjustable so that a single coupling may be used to deliver a range of maximum torque settings.

Further, it is an object of the present invention to provide an adjustable torque regulating coupling having a fixed length that is convenient and easy to use.

Still further, it is an object of the present invention to provide a fixed-length, adjustable torque regulating coupling of simple construction.

Yet further, it is an object of the present invention to provide a fixed-length, adjustable torque regulating socket that is simple and inexpensive to manufacture.

Briefly, the torque regulating coupling in accordance with this invention realizes the above-noted and other objectives by featuring a coupling body having a first end configured to be connected to an impact wrench drive. Further, the coupling includes a slider and transmission member cooperatively disposed within the body for communicating a portion of the impulse torque applied at the body in a first or tightening direction to a wrench socket connected to the transmission member. Finally, the coupling features an adjustment mechanism for variably positioning the slider at the transmission member to vary the amount of tightening, impulse torque communicated from the impact wrench drive to the impact wrench socket.

In accordance with the invention, the slider is rotationally fixed, but axially movable within the body and disposed to engage the transmission member at varying points along the member's length, the member being fixed mounted and coaxially disposed within the coupling body. Additionally, the transmission member is configured as a stack of multiple, individual elements that collectively have a torque-impulse loss characteristic that is dependent on the stack configuration and the member length over which the torque is applied. Accordingly, for a particular stack configured; i.e. size, number and material of elements, the stack communicates a portion of impulse torque dependent on the length of the stack as measured from the point of torque application to the point of torque action.

Also in accord with the invention, the coupling body is provided with a input recess centrally located at a first end of the body for receiving an impact wrench drive plug, while, the transmission member is retained within a mounting element radially disposed at the coupling body second end, the transmission member extending from the interior face of the mounting element axially inwardly of the body. Further, a coupling output drive plug is provided centrally at the exterior face of the mounting element for engaging the wrench socket. Finally, the slider is arranged to receive the transmission member and be position at various lengths along the member's length measured from the member mounting element, the slider being moved along the transmission member's length by the coupling adjustment mechanism.

In a first preferred form, the coupling adjustment mechanism features an adjustment sleeve rotationally received at the exterior of the coupling body and a positioning pin that extends radially inwardly from the sleeve through a slot provided in the body wall to the slider. The pin at a first end is bearinged in a helical groove cut in the interior face of the sleeve, and at its second end received in the slider such that when the sleeve is rotated at the body, the position pin is advanced in the helical grove and the slider moved over the length of the transmission member.

Additionally, in the first preferred form, the adjustment mechanism includes a spring biased, releasable locking collar mounted at the coupling body for stopping the sleeve and positioning pin at various adjustment settings. The collar includes teeth that interlock with companion teeth provided at the sleeve and is rotationally fixed to prevent movement of the sleeve when the sleeve and collar teeth are meshed. The collar, however, is manually, axially movable against the spring bias to permit withdrawal of the collar in order to allow adjustment of the sleeve, pin and slider positions. Finally, an maximum-torque-indicator scale is provided on the coupling body that cooperates with a pointer provided on the sleeve so that rotational adjustment of the sleeve can be indexed to maximum torque transmission setting for the coupling.

In a second preferred form, the coupling adjustment mechanism again incudes an adjustment sleeve rotationally received at the exterior of the coupling body. However, in the second form, the adjustment mechanism features an internal planetary gear that cooperates with a pinion gear mounted in the coupling body for driving a threaded positioning shaft received in the slider. Accordingly, as the sleeve is rotated, the threaded shaft is rotated so as to reposition the slider along the transmission member.

In the second preferred form, the adjustment mechanism also additionally includes a releasable locking collar mounted at the coupling body for stopping the sleeve and threaded positioning shaft at various adjustment settings. In the second preferred form, the locking collar includes a finger that actuates a locking pin radially located in the coupling body to intercept the planetary gear. In a first, locked position, the collar and finger urge the pin against the planetary gear stopping rotation. In a second unlocked position, the planetary gear is free to pass over the pin, permitting adjustment of the sleeve, threaded shaft and slider positions. Finally, as in the first embodiment, a maximum-torque-indicator scale and pointer are provided to index sleeve position and maximum torque setting. However, in the second preferred embodiment, the scale is provided on the rotary sleeve and the pointer fixed on the coupling body.

Yet additionally in both the first and second preferred forms of the invention, the mounting element for the transmission member includes a shoulder disposed proximate the coupling body so that impulse torque applied in a second or reverse direction by the wrench drive; as for example, to remove fasteners, bypasses the transmission member and is fully applied to loosen and withdraw the fastener.

BRIEF DESCRIPTION OF THE DRAWINGS

The above and other features of the invention may be understood on a review of the following detailed description read in connection with the figures in which.

DESCRIPTION OF THE PREFERRED EMBODIMENT

As noted above, though impact wrenches have proven themselves to be of great advantage in assembling and disassembling all types of mechanical systems, they are subject to the problems of uncertain and improper amounts of applied torque that can lead to either over tightening that damages assembled systems, or under tightening that cause systems to loosen and come apart.

As also noted, for the sake of convenience, most impact wrench users stop applying torque when they feel the sound and blur characteristically associated with the tightening process have diminished "enough" in their estimation to satisfy the particular needs of assembly being working on. This estimated "enough", however, leads at best to uncertainty in the amount of applied torque, and at worst to either damaged or dangerously under-fastened assemblies. If the finally applied torque is too great, fasteners become damaged or sheared and matting parts are deformed. Additionally, substantial difficulty can be encountered in attempting to take apart such assemblies. On the other hand, if the finally applied torque is too low, potentially dangerous, inadequately fastened assemblies can result which are susceptible to coming apart on their own.

The torque regulating coupling of the present invention, however, provides an inexpensive and simple device for overcoming the uncertainty of torque application experience in the past. Particularly, the torque regulating coupling of the present invention, when connected between the impact wrench drive and socket, enables a user to positively dial in and set the maximum torque that will be transmitted from the drive to the socket and fastener, thus conveniently providing integrity and certainty to the fastened assembled.

Figure 3:
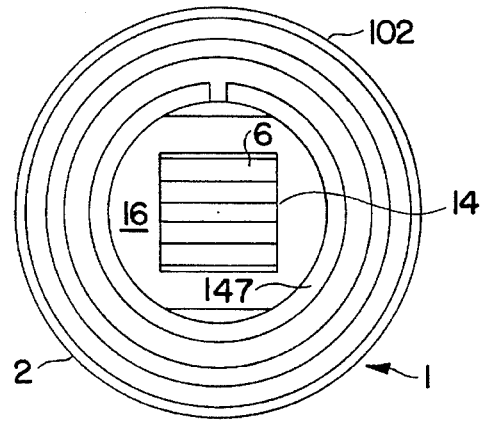
FIG. 3 is a rear-elevation view of the torque regulating coupling in accord with a first preferred form of the invention.
Figure 4:
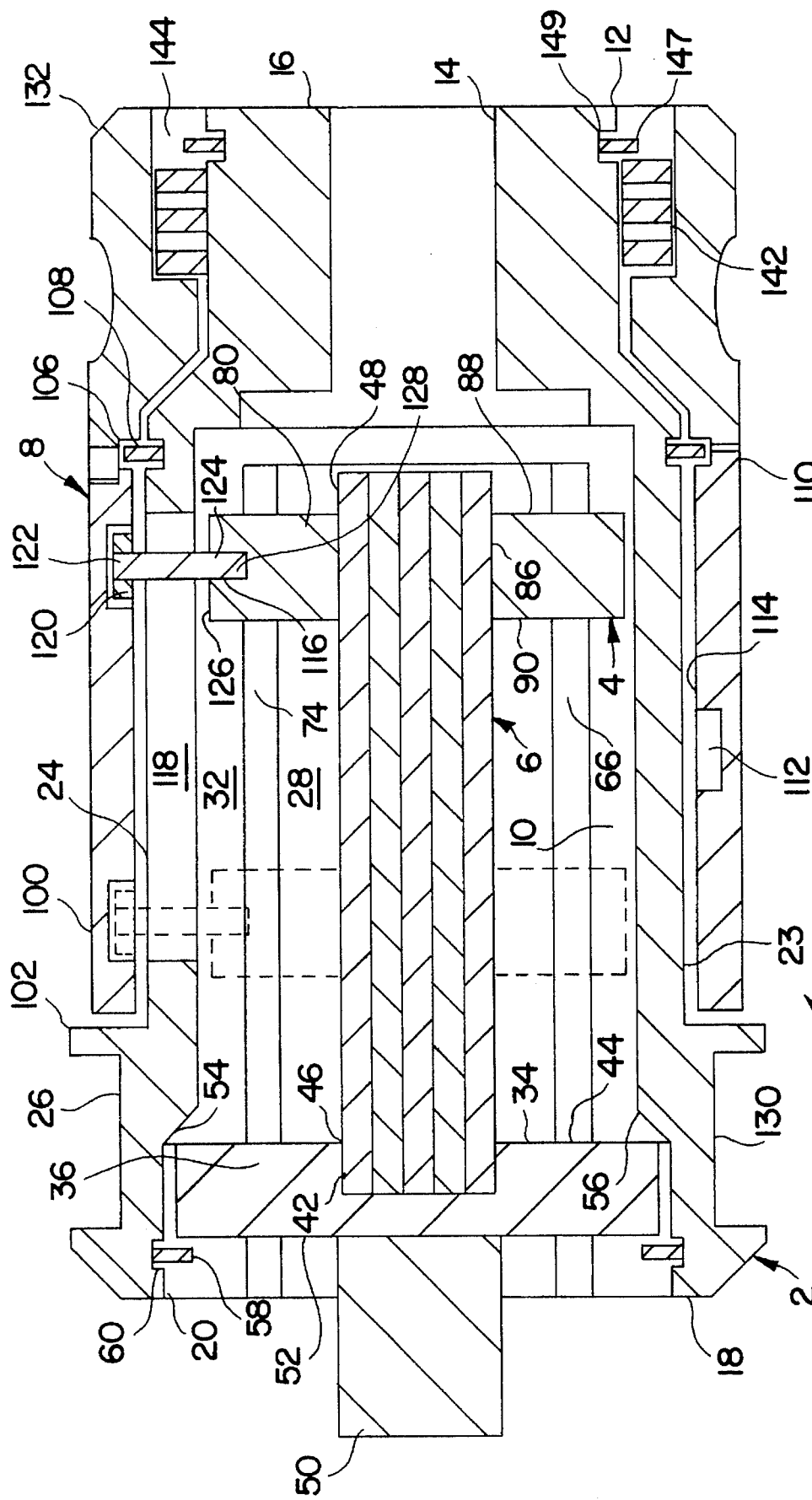
FIG. 4 is a side-section view of the torque regulating coupling in accord with a first preferred form of the invention taken along lines 4—4 of FIG. 2.
Figure 5:
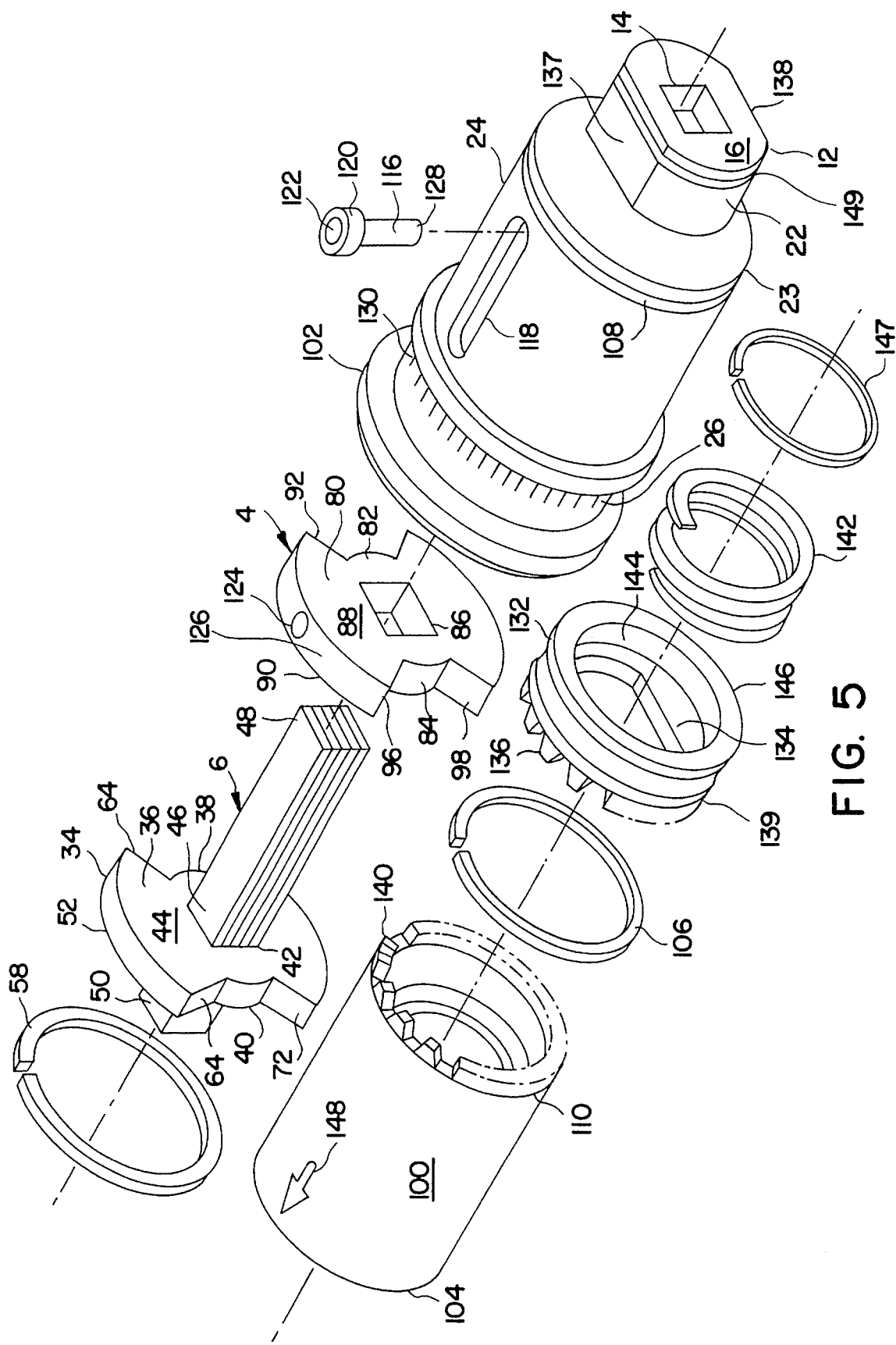
FIG. 5 is an exploded-perspective view of the torque regulating coupling in accord with a first preferred form of the invention.
Figure 6:
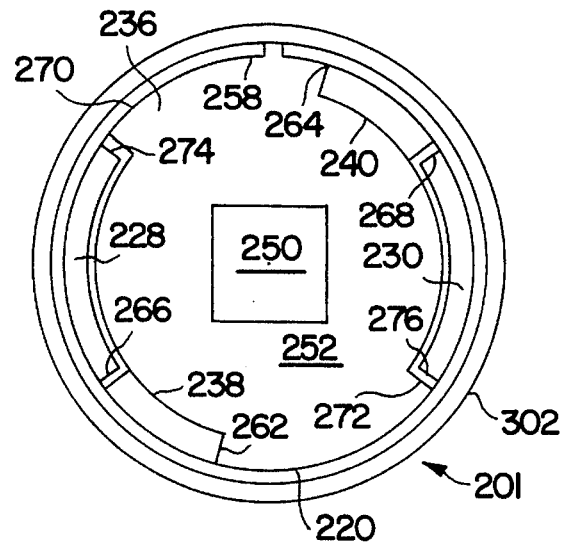
FIG. 6 is a front-elevation view of the torque regulating coupling in accord with a second preferred form of the invention.
Figure 7:
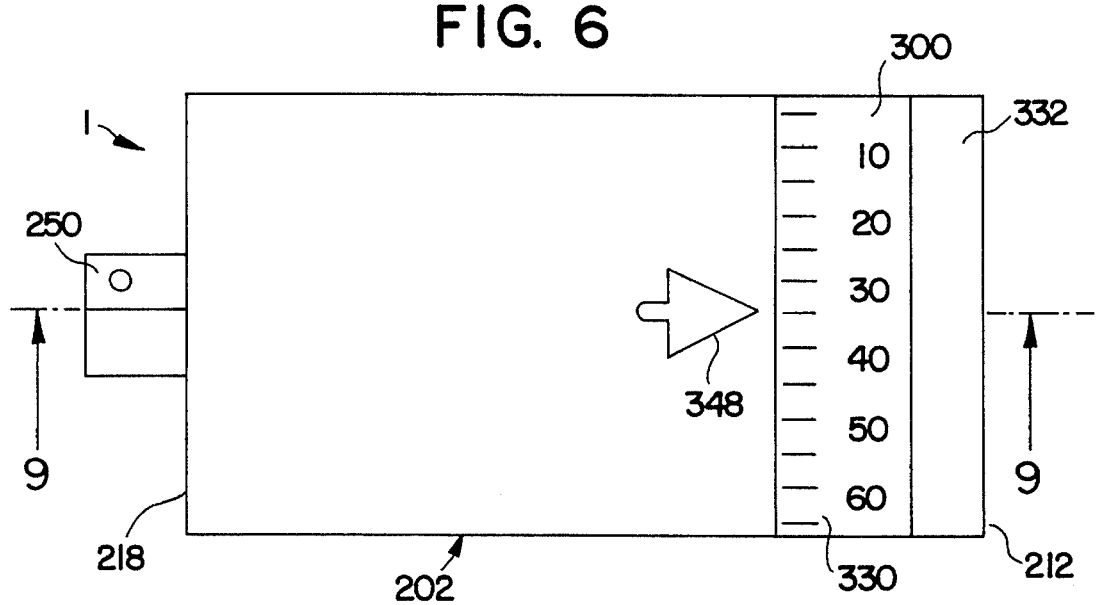
FIG. 7 is a plan view of torque regulating coupling in accord with a second preferred form of the invention.
Figure 8:
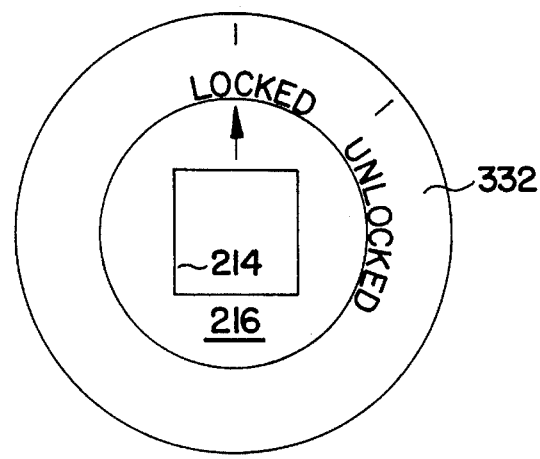
FIG. 8 is a rear-elevation view of the torque regulating coupling in accord with a second preferred form of the invention.

The torque regulating coupling in accordance with the present invention is shown in a first preferred form in FIGS. 1–5. As best seen in FIGS. 4 and 5, coupling 1 features a coupling body 2 combined with a cooperatively associated slider 4 and impulse torque transmission member 6 disposed within body 2. Further, coupling 1 is additionally seen to include an adjustment mechanism 8 for moving slider 4 over the length of transmission member 6.

With reference to FIG. 4, coupling body 2, is seen in preferred form to be a generally hollow cylinder having an internal cylindrical cavity 10 in which transmission member 6 and slider 4 are provided. Additionally, body 2 is seen to include a first or drive-input end 12 in which a recess or socket 14 is provided for receiving the drive plug of a impact wrench drive, not shown. As shown in FIG. 3, drive-input recess 14 is square and located centrally of body end wall 16.

Figure 1:
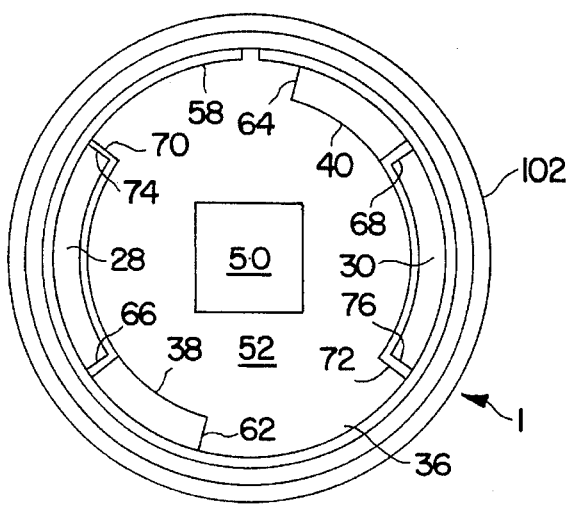
FIG. 1 is a front-elevation view of the torque regulating coupling in accord with a first preferred form of the invention.
Figure 2:
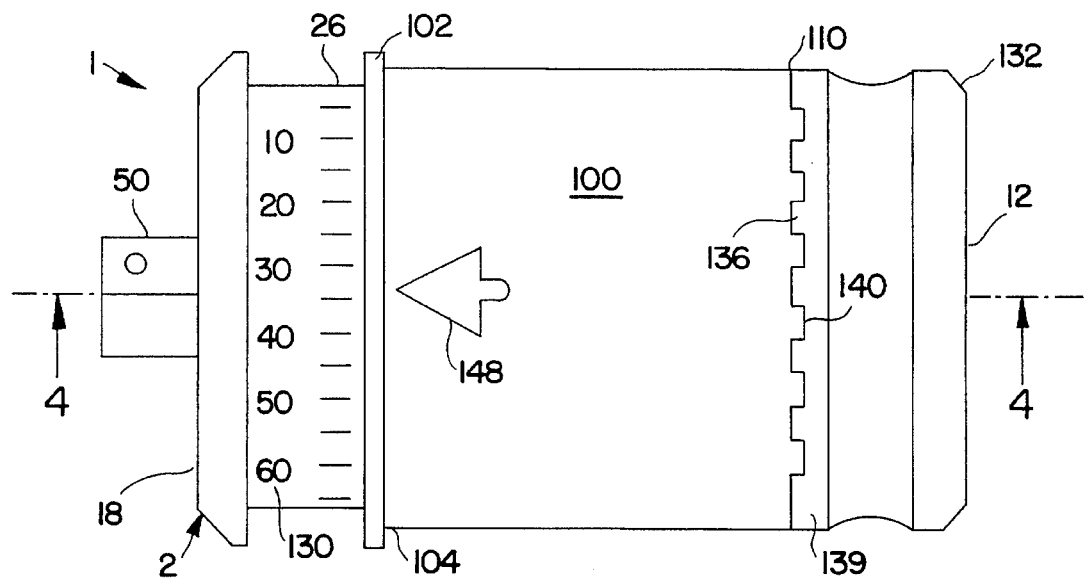
FIG. 2 is a plan view of torque regulating coupling in accord with a first preferred form of the invention.

Additionally, body 2 is seen to have a second or front end 18 formed with a mouth 20 opening on cavity 10 for receiving transmission member 6 and slider 4. Continuing, body 2 is further seen to include a cylindrical side wall 23 that is radially stepped and axially extended from body rear end 12 to front end 18. As will be described more fully below, body side wall 23 includes a first radially-reduced portion 23 and subsequently radially-increased portions 24 and 26 for receiving elements of the adjustment mechanism 8. Yet additionally, coupling body cavity 10 is seen to also include, sculptured, straight-lined guide rails 28, 30 provided on cavity interior wall 32 opposite one another; i.e., rail radially centerline spacing being 180 degrees, the rails extending axially inwardly of cavity 10 from body mouth 20 as best seen in FIGS. 1 and 4.

As best seen in FIGS. 4 and 5, transmission member 6 is coaxially located in cavity 10 of body 2 by a mounting element 34. Mounting element 34 is in the form of a cylindrically block 36 having a generally bow-tie-shaped outline sized to conform with the contour of cavity 10, block 36 featuring cutouts 38, 40 to accommodate rails 28, 30. Additionally, block 36 is provided with a coaxially located socket 42 at block interior face 44 in which a first end 46 of transmission member 6 is received and held in any convenient manner, as for example by press fit. By virtue of this arrangement, transmission member 6 is fixed to block 36 at transmission member end 46 with member second end 48 extending into cavity 10 as shown.

Continuing with reference to FIG. 4, block 36 is also seen to include an output drive plug 50, coaxially located at block exterior face 52 for connecting the transmission member and coupling to an impact wrench socket not shown.

As seen in FIG. 4, block 36 and with it member 6 is coaxially fixed mounted in cavity 10 by abutting block interior face 44 against a stop 54 formed by reduced-radius shoulder 56 of cavity interior wall 32. A retainer ring 58 of conventional design is provided at grove 60 of cavity wall 32 to restrain block axial movement.

On the other hand, while block 36 and member 6 are axially fixed, they are free to rotate within bounds defined by the spacing between the shoulders of block cutouts 38, 40, and shoulders of cavity guide rails 28, 30. As best seen in FIG. 1 block 36 is free to rotate clockwise; i.e., in the fastener-tightening direction until shoulders 62 and 64 of cutouts 38 and 40, respectively, contact shoulders 66 and 68 of rails 28 and 30 respectively. As shown in FIG. 1, and as will be appreciated by those skilled art, the spacing provided for clockwise; i.e., tightening, rotation is sufficient to permit transmission member 6 to flex and dissipate applied drive torque as the maximum torque is transmitted to the fastener being tightened.

However, in the counter-clockwise; i.e., loosing direction, minimal spacing is provided between shoulders 70 and 72 of cutouts 38 and 40, respectively, and shoulders 74 and 76 of rails 28 and 30 respectively so that drive torque applied to the coupling will not be dissipated by transmission member 6, but rather be transmitted from the body 2 directly to block 36, effectively bypassing transmission member so full wrench drive torque can be applied to loosening and removing fasteners.

Continuing, in accordance with the invention, transmission member 6 is formed as a stack of multiple, individual elements that collectively have a torque-impulse loss characteristic that is dependent on the stack configuration and the member length over which the torque is applied. As will be appreciated by those skilled in the art, to achieve a coupling having a wide range of maximum torque setting in a conveniently short; i.e., a commercially attractive, unit, it is essential that the transmission member have a high impulse torque loss characteristic per unit length. In accordance with this invention, it has been found that the loss characteristic of the member can be significantly exaggerated with respect to the material selected, if the member is formed as a stack of individual elements. It has been found that the additional loss provided at the element interfaces can be exploited in conjunction with the conventional material characteristics and dimensioning for traditional solid transmission bars to achieve rigid, high impulse torque transmission characteristics over short member lengths and flexible, low torque transmission characteristics over longer lengths which are still substantially shorter that lengths that would be required for solid members made of comparable material.

In accordance with the invention, it has been found preferable to form the transmission member as a generally square, staked element beam as shown in the figures. Further, with use of such a beam, it has also been found that a coupling can be achieved having maximum applied torque that range from 55 foot pounds to 120 foot pounds with an operable member length of 1.25 inches where the member is made of eight, one sixteenth inch thick by one half inch wide annealed steel elements of Rockwell "C" Scale hardness of 46. As will be appreciated by those skilled in the art, the transmission characteristic of the member can be readily adjusted by varying conventional stiffness parameters such as element width, thickness, material and element number to tailor the member as desired.

Continuing with reference to FIG. 4, in accordance with the invention, slider 4 is used to communicate impulse torque applied by an impact wrench drive at body end 12 to selectable points along the length of transmission member 6. As best seen in FIGS. 4 and 5, like transmission member mounting element 34, slider 4 is seen to include a cylindrical block 80 having a generally bow-tie-shaped outline sized to conform with the contour of cavity 10, slider block 80 featuring cutouts 82, 84 to accommodate cavity guide rails 28, 30.

Additionally, slider block 80 is seen to include a coaxially located, passage way 86 that extends from block inboard first face 88 to outboard face 90, through which transmission member 6 is slidably received. In accordance with the invention, slider block 80 is rotationally fixed, but axially movable within the body. To accomplish this, slider block cutouts are dimensioned to closely follow the contours of guide rails 28, 30 such that slider block cutout shoulders 92, 94 and 96, 98 of cutouts 82, 84, respectively, slidably follow shoulders 74, 66 and 68, 76 of rails 28, 30 respectively.

As will be appreciated, since the slider cutout shoulders closely follow body guide rails 28, 30, impulse torque applied to body 2 is communicated from the body rails to slider block 80 and subsequently to transmission member 6 at the walls of slider guideway 86. And, as will be appreciated by those skilled in the art, where clockwise; i.e., tightening, impulse torque is applied, the impulse torque transmitted to coupling output plug 50 and the wrench socket is dependent on the point along the length of transmission member 6 that slider block 80 is located i.e., the further the distance from member fixed end 46, the less the transmitted impulse torque.

In accordance with the invention, to adjust the position of slider block 80 along the length of member 6, coupling 1 includes adjustment mechanism 8. As seen in FIGS. 4 and 5, in a first preferred form, adjustment mechanism 8 features a cylindrical adjustment sleeve 100 rotationally received at body radially-increased portion 24. The internal diameter of cylindrical sleeve 100 is dimensioned to permit 100 to freely rotate at body portion 24. Sleeve 100 is located on body 2 by a locating rib 102 that radially extends for the outer wall of body 2 to position forward end 104 of sleeve 100. Sleeve 100 is axially fixed at body portion 24 by means of retainer ring 106 received in retainer groove 108 that restrains rear end 110 of sleeve 100.

Continuing, sleeve 100 further includes a rectangular, helical transport groove 112 cut in sleeve interior face 114. Further, adjustment mechanism 8 also includes a positioning pin 116 which is received at sleeve groove 112 and extends radially inwardly of sleeve 100 into body 2 and cavity 10 to coupling slider block 80. Positioning pin 116 passes through body cylindrical wall 32 at an axially extending positioning slot 118. In preferred form, pin 116 is provided with a bearing 120 at pin first end 122 received in groove 112 and is press fit to bore 124 provided at side wall 126 of slider 80 at pin end 128.

In preferred form, the pitch of groove 112 is selected such that one revolution of sleeve 100 translates positioning pin 116 and slider block 80 over the operational length of transmission member 6 i.e., from the position of least torque transmission shown in solid line in FIG. 4, to the position of greatest torque transmission shown in phantom line in FIG. 4. This facilitates selecting any of the maximum torque setting the coupling can provide with a single turn of sleeve 100. Additionally, it enables the providing of a maximum torque scale 130 at body increased diameter portion 26 that expresses the full range of the maximum torque settings for coupling 1.

Additionally, in the preferred form of the invention shown in FIGS. 1–5, adjustment mechanism 8 includes a spring biased, releasable locking collar 132 mounted at coupling body reduced radius portion 22 for stopping sleeve 100 and positioning pin 116 at various adjustment settings. Collar 132 like sleeve 100 is cylindrical, but is provided with a squared-off, forwarded end 134 that cooperates with flats 137, 138 provided at body radially-reduced potion 22 to prevent collar 132 from rotating on body 2 as best seen in FIG. 5. Additionally, collar 132 is provided with teeth 136 at collar forward end 139 that axially extend from collar 132 to align and interlock with companion teeth 140 provided at sleeve end 110.

Since collar 132 is rotationally fixed on body 2, sleeve 100 is rotationally locked to prevent sleeve movement when the sleeve and collar teeth are meshed. Collar 132, however, while rotationally fixed is manually, axially movable against the bias of a spring 142 provided internally of a cylindrical recess 144 located at collar rear end 146. As best seen in FIG. 4, spring is axially restrained in the outboard direction at body portion 22 by a retainer ring 147 provided at groove 149. This arrangement permits manual withdrawal of collar 132 in order to allow adjustment of the sleeve, pin and slider positions. Finally, as noted, adjustment mechanism 8 includes a maximum-torque-indicator scale 130 located on coupling body portion 26 that cooperates with a pointer 148 provided on sleeve 100 so that rotational adjustment of sleeve 100 can be indexed to maximum torque transmission setting for the coupling.

In operation, to tighten a fastener, coupling 1 is mounted to an impact wrench drive by connecting the wrench drive plug to coupling input recess 14 provided at coupling body end 12. Thereafter, a wrench socket is mounted to coupling 1 by connecting the socket to coupling output-drive plug 50 provided at coupling body front end 18. Next the operator simply withdraws locking collar 132 and rotates sleeve 100 so that fixed pointer 148 at sleeve 100 aligns with the desired maximum torque selected at scale 130. As sleeve 100 is rotated to select the desired maximum torque, sleeve groove 112 drives positioning pin 116 and slider block 80 to the correct position on transmission member 6. Finally, when the desired maximum torque is dialed in, the operator can mount the wrench socket to the fastener to be tightened and activate the drive.

As the fastener tightens, increased resistance at the fastener causes proportionally more of the applied impulse torque to be dissipated in rotationally distorting coupling, transmission member 6 thereby providing increasingly less rotation at the fastener. Subsequently, when the maximum torque is reached, all impulse torque applied to coupling 1 is dissipated in rotationally distorting transmission member 6 and operation is terminated.

For the removal of fasteners, since by virtue of the mounting arrangement of transmission member 6, as described above, all loosing torque is directly applied to coupling output plug 50, there is no need to change the coupling maximum torque setting, and the fastener can simply be withdrawn with the full impact torque of the wrench drive.

In a second preferred form of the coupling in accordance with the invention shown in FIGS. 6–10, the structural and functional features of the coupling are substantially the same as those shown in FIGS. 1–5 with exception of the slider adjustment mechanism. Accordingly, only description of the second form of the adjustment mechanism need be considered. Further, in describing the second preferred form of the coupling like elements will be referenced with like numerals incremented by 200.

Figure 9:
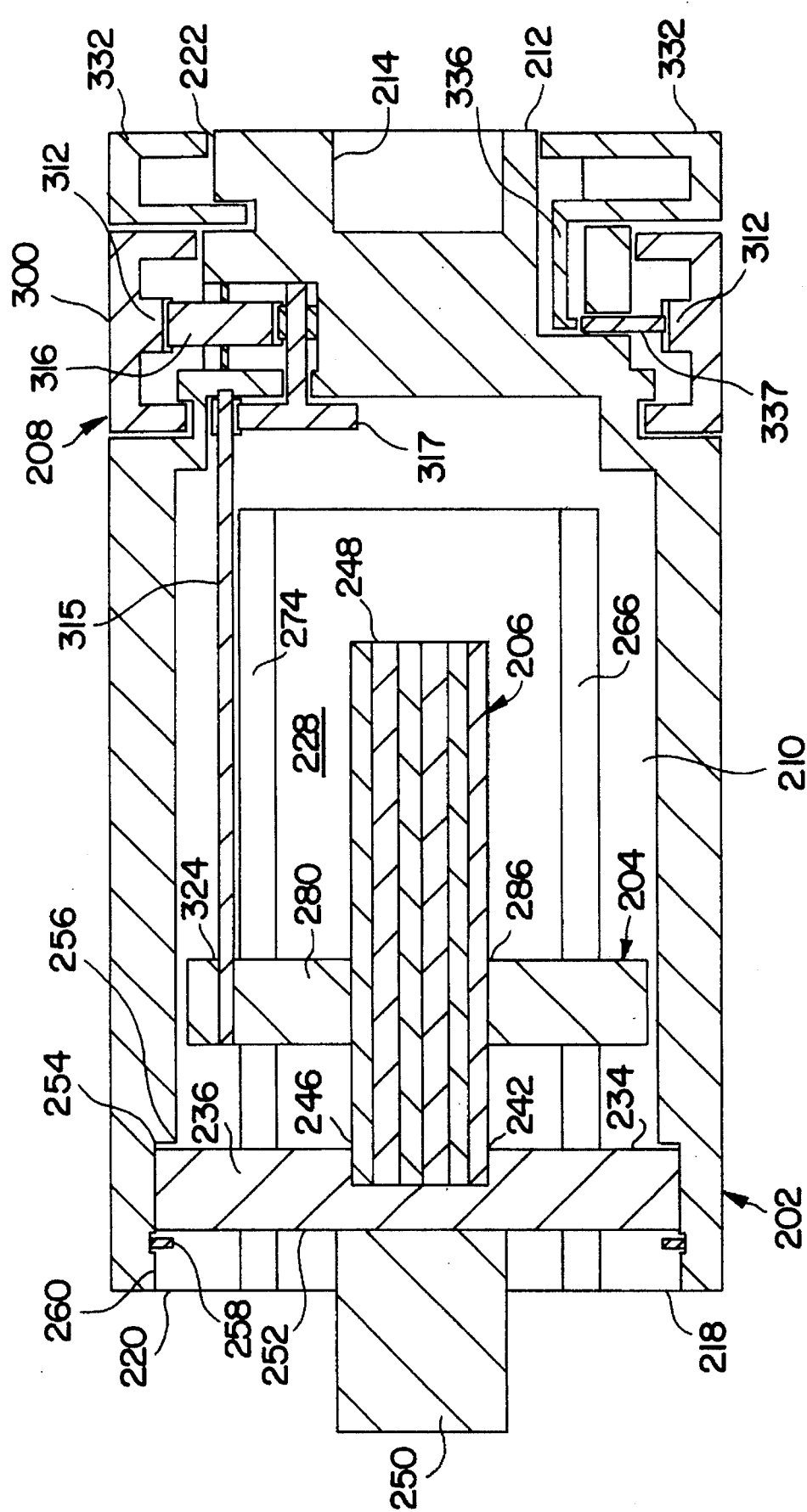
FIG. 9 is a side-section view of the torque regulating coupling in accord with a second preferred form of the invention taken along lines 9—9 of FIG. 7.
Figure 10:
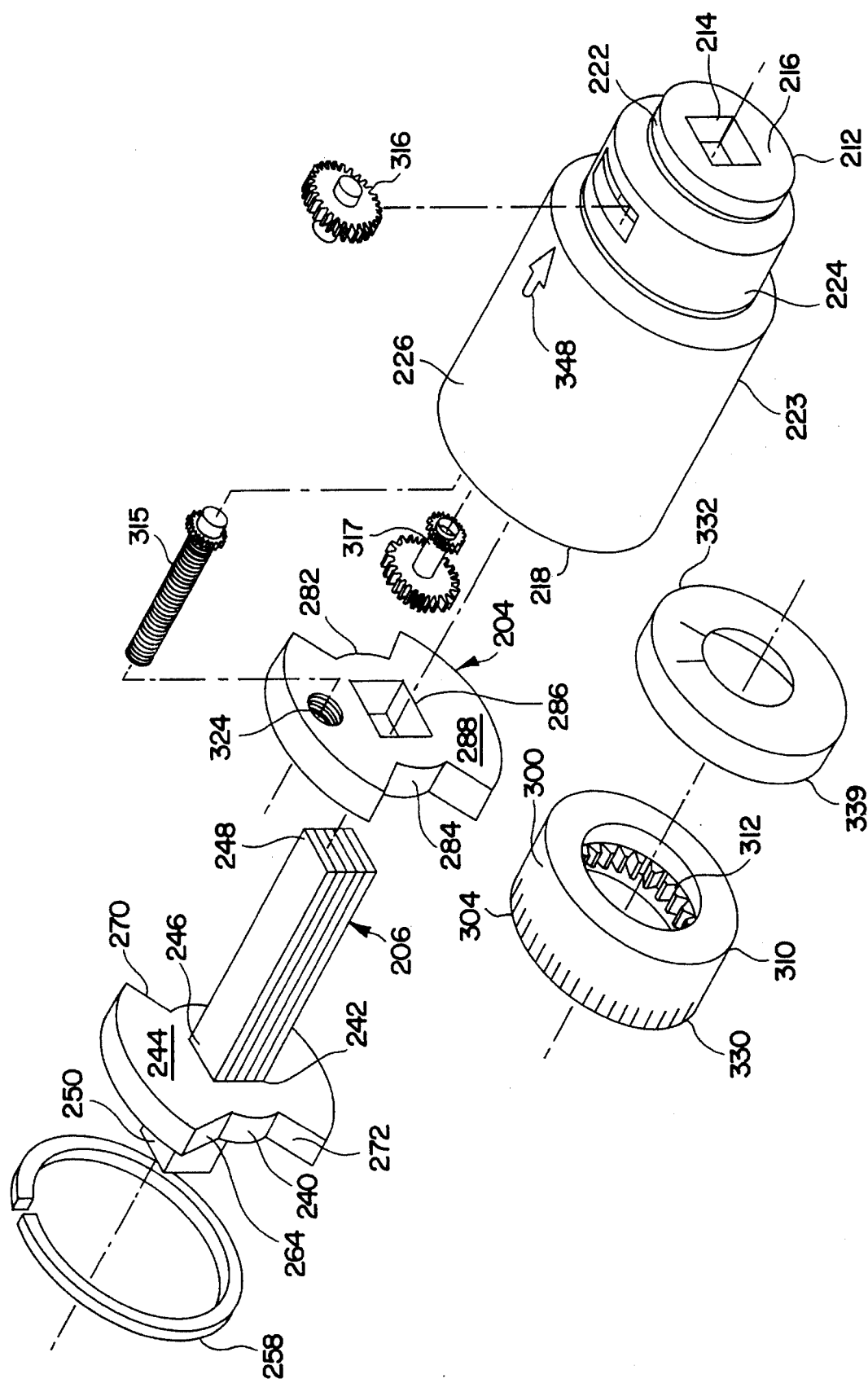
FIG. 10 is an exploded-perspective view of the torque regulating coupling in accord with the a second preferred form of the invention.

As in the case of the first preferred form of coupling 1, the second preferred form of the coupling, designated 201 again incudes an adjustment sleeve 300 rotationally received at the exterior of coupling body 202. However, in the second form, adjustment mechanism 208 features an internal planetary gear 312 that cooperates with a pinion gear 316 mounted in the coupling body for driving a threaded positioning shaft 315 received in a threaded bore 324 provided at interior face 288 of slider block 280 as best seen in FIG. 9. Accordingly, as sleeve 300 is rotated, threaded shaft 316 is rotated so as to reposition slider block 280 along the length of transmission member 206. In the preferred form of the second embodiment, a further gear assembly 317 may be provided to assure that the full travel of slider block 280 may be achieved with single revolution of sleeve 300.

Additionally, in the second preferred form, adjustment mechanism 208 also additionally includes a releasable locking collar 332 mounted at coupling body 202 for stopping sleeve 300 and threaded positioning shaft 315 at various adjustment settings. In the second preferred form, locking collar 332 includes a finger 336 that actuates a locking pin 337 radially located in the coupling body to intercept planetary gear 312 as best seen in FIG. 9. As shown in a first, locked position, collar 332 and finger 336 urge pin 337 against the planetary gear stopping rotation. In a second unlocked position rotation of collar 332 and finger 336 removes the radial outward bias at pin 337 and, planetary gear 312 is free to pass over pin 337, permitting adjustment of the sleeve, threaded shaft and slider positions. Finally, as in the first embodiment, a maximum-torque-indicator scale 330 and pointer 348 are provided to index sleeve position and maximum torque setting. However, in the second preferred embodiment, the scale is provided on rotary sleeve and the pointer fixed on coupling body 202.

In operation, the second embodiment is the same as the first, with the exception that the planetary gear assembly, threaded positioning shaft, locking collar finger and pin are manipulate to achieve maximum torque adjustment.

While we have described our invention in preferred form, it will be appreciated by those skilled in the art that various changes in form, construction and arrangements of its elements may be made without departing from the spirit or scope of the invention.

What we claim is:

1. An impact wrench torque regulating coupling, the coupling comprising:

a body means for receiving torque from an impact wrench drive;

a torque transmission means for transmitting torque supplied by the wrench drive to a wrench socket, the torque transmission means including a plurality of transmission elements combined to provide torque transmission loss that is dependent upon the point on the transmission means at which the torque is applied, the plurality of transmission elements being arranged in a stack to form a transmission member that extends axially relative to the body means;

contacting means for applying torque at a point on the transmission means, the contacting means being connected to the body means and the transmission means; and wrench socket engaging means for connecting the transmission means to the wrench socket such that torque applied to the body means is communicated to the transmission means and the transmission means communicates at least a portion of the torque applied to the body means at the socket engaging means, the portion of the torque communicated by the transmission means depending on the point on the transmission means at which the torque is applied.

2. The coupling of claim 1 further including adjustment means for varying the point on the transmission means at which the contacting means applies torque to the transmission means.

3. The coupling of claim 2 wherein the transmission member and the slider are mounted in the body means, the torque transmission member being axially disposed within the body means and the slider being axially movably along the transmission member to vary the point at which torque is applied to the transmission member.

4. The coupling of claim 3 the body is a cylindrical element including a internal cavity in which the transmission member and slider are provided.

5. The coupling of claim 4 wherein the slider is rotationally fixed, but axially movable within the body member and disposed to engage the transmission member at varying points along the member's length, the member being fixed mounted and coaxially disposed within the coupling body.

6. The coupling of claim 5 wherein the body means has a first end and a second end, and wherein the impact wrench drive is connected to the coupling at the body first end, and the transmission member is retained within a mounting means disposed at the body second end.

7. The coupling of claim 6 wherein the socket engaging means includes an output drive plug provided at the transmission member mounting means.

8. The coupling of claim 7 wherein the slider adjustment means includes an adjustment sleeve rotationally received at body means and a positioning pin connected to the sleeve and extending into the body cavity to connect to the slider so that as the sleeve is rotated, the slider is moved along the transmission member.

9. The coupling of claim 8 wherein the sleeve includes a groove for receiving the position pin and moving the pin as the sleeve is rotated.

10. The coupling of claim 9 wherein the adjustment means includes a releasable locking collar for stopping the sleeve and positioning pin at various adjustment settings, the collar including teeth that interlock with companion teeth provided at the sleeve.

11. The coupling of claim 7 wherein the adjustment means includes an adjustment sleeve rotationally received at the exterior of the body means, the sleeve having an internal planetary gear that cooperates with a pinion gear mounted in the coupling body means for driving a threaded positioning shaft received in the slider.

12. The coupling of claim 11 wherein the adjustment means includes a locking collar mounted at the body means for stopping the sleeve and threaded positioning shaft at various adjustment settings, the locking collar including a finger that actuates a locking pin located in the body means to intercept the planetary gear.

* * * * *